(12) United States Patent
Pezet

(10) Patent No.: US 8,597,157 B2
(45) Date of Patent: Dec. 3, 2013

(54) REDUCTION GEAR AND AN ELECTRIC ACTUATOR INCLUDING SUCH A REDUCTION GEAR

(75) Inventor: Jerome Pezet, Villaz (FR)

(73) Assignee: Somfy SAS, Cluses (FR)

( * ) Notice: Subject to any disclaimer, the term of this patent is extended or adjusted under 35 U.S.C. 154(b) by 440 days.

(21) Appl. No.: 13/048,568

(22) Filed: Mar. 15, 2011

(65) Prior Publication Data
US 2011/0230293 A1 Sep. 22, 2011

(30) Foreign Application Priority Data
Mar. 19, 2010 (FR) ...................... 10 52003

(51) Int. Cl.
*F16H 57/08* (2006.01)
(52) U.S. Cl.
USPC .......................................... 475/347
(58) Field of Classification Search
USPC .......................... 475/149, 346, 347
See application file for complete search history.

(56) References Cited

U.S. PATENT DOCUMENTS

| 3,741,041 | A  | * | 6/1973  | Boor ............................. 475/338 |
| 3,974,718 | A  | * | 8/1976  | Kylberg ....................... 475/347 |
| 5,366,423 | A  |   | 11/1994 | Mori et al. |
| 7,083,538 | B2 | * | 8/2006  | Szalony et al. ............... 475/149 |
| 2006/0247089 | A1 | | 11/2006 | Guo |

FOREIGN PATENT DOCUMENTS

| EP | 0863331 A2 | 9/1998 |
| EP | 0863331 A3 | 9/1998 |
| FR | 2742834 A1 | 6/1997 |

* cited by examiner

*Primary Examiner* — Edwin A Young
(74) *Attorney, Agent, or Firm* — Dowell & Dowell, P.C.

(57) ABSTRACT

This reduction gear of an electric actuator (1) for driving a home screen, the reduction gear comprises a reduction stage having a sun gear (42) meshing with at least one planet gear (46, 46') rotating about a respective shaft (47) and positioned in a drum (45), the planet gear meshing with a stationary ring (48) to drive the drum (45) in rotation about an axis of rotation ($X_4$). The reduction gear further comprises first guide means (43) serving both to guide the sun gear (42) in rotation and to guide the drum (45) in rotation about the axis of rotation ($X_4$).

10 Claims, 3 Drawing Sheets

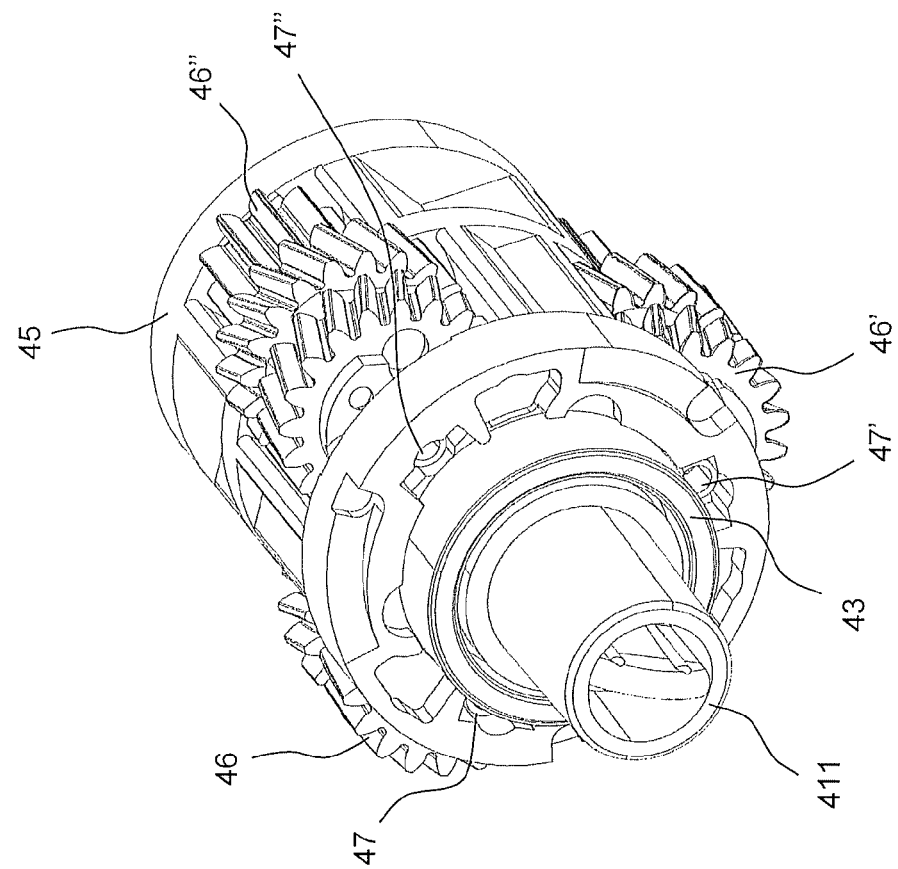
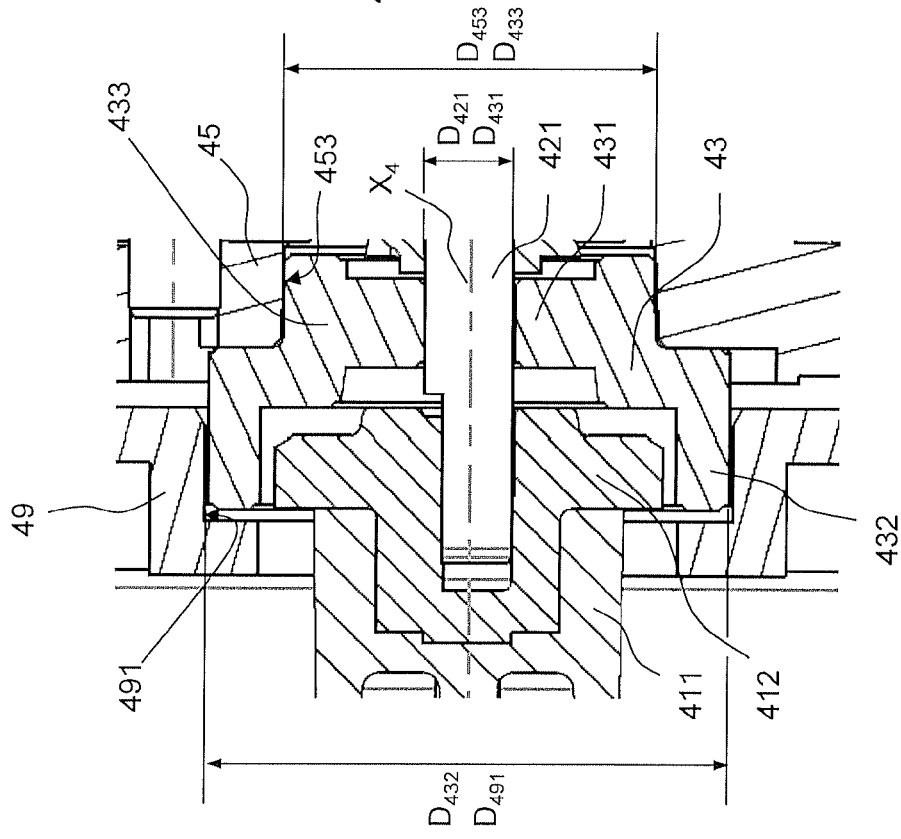
Fig. 4
Fig. 3

REDUCTION GEAR AND AN ELECTRIC ACTUATOR INCLUDING SUCH A REDUCTION GEAR

TECHNICAL FIELD

The invention relates to a reduction gear and to an electric actuator for driving a home screen. The invention also relates to an electric tubular actuator for driving a home screen and including such a reduction gear.

STATE OF THE ART

Home screens are generally driven by electric tubular actuators. These comprise an electric motor mounted inside a tube. The electric motor drives a motor shaft in rotation at a relatively high speed, of the order of 2800 revolutions per minute (rpm), in Europe. Thus, in order to obtain a speed of rotation and a torque that are of use at the outlet from the actuator, a reduction gear is associated with the motor. The reduction gear often has three reduction stages.

In a common design, the first stage of the reduction gear comprises a sun gear coupled to the outlet shaft of the electric motor and meshing with three planet gears housed in a drum and situated at the same level, axially and radially. The planet gears rotate about respective shafts that are secured to the drum. Each planet gear is located at 120° from the other two. Each planet gear meshes with a common stationary ring so as to cause the drum rotate about its axis of revolution. The drum includes an outlet interface for the stage. This interface may comprise the sun gear for the following stage.

Most actuator manufacturers seek to reduce the noise generated by that subassembly. One source of noise comes from the moving elements. Consequently, it is found to be advantageous from a noise point of view to improve the positioning of the movable elements relative to one another, and more particularly to improve the positioning of the parts of the first stage since they are the parts that rotate the fastest.

Patent EP-B-0 863 331 illustrates a design in which the motor shaft is guided by a bushing inserted in the center of a casing. The end of the motor shaft is connected to the sun gear of the first reduction stage by a coupling. The casing also includes a bore enabling the drum to be centered. Furthermore, the sun gear is centered by a stud that extends the sun gear and that is housed in a fitting on the drum. In order to reduce noise, there must be little backlash, thus implying that the sun gear and the planet gears need to be well positioned relative to one another. Unfortunately, since the planet gears are positioned directly relative to the drum, it is important for the sun gear also to be well positioned relative to the drum. In the example illustrated in that patent, the sun gear is well centered at a first end by the stud at the end of the gearwheel. However, the second end of the sun gear is centered relative to the drum in a manner that is less direct. The sun gear is connected to the coupling part that co-operates with the motor shaft, the motor shaft being guided by a bushing that is fastened to the casing, and it is the casing that centers the drum. The slack available to the second end can thus be sufficiently great to disturb meshing and to generate noise.

SUMMARY OF THE INVENTION

The invention provides a reduction gear for an electromechanical actuator, the reduction gear comprising a reduction stage comprising a sun gear meshing with at least one planet gear housed in a drum. The planet gear revolves about a shaft secured to the drum and meshes with a stationary ring in order to drive the drum in rotation about an axis of rotation. The sun gear and the drum are guided in rotation about the axis of rotation by common guide means.

The use of common guide means serves to improve the positioning of the sun gear relative to the drum, and consequently to improve the positioning of the sun gear relative to the planet gear. The arrangement of these parts is regular, thereby reducing the sound level generated by the actuator.

The positioning of the sun gear relative to the drum is direct since the sun gear is guided in rotation by two guide means that are in contact with the drum. The shaft supporting the planet gear is fastened to the drum at both ends, thereby ensuring that the shaft is in a stable position within the drum. Backlash is thus under control.

The guide means may be secured to the drum. The guide means are then in contact with the sun gear but they are also housed in part in a location within a stationary casing. Under such circumstances, the sun gear is movable relative to the guide means and the subassembly formed by the drum and the guide means is movable relative to the stationary casing. The guide means thus serve to guide the sun gear and the drum in rotation about their common axis of revolution.

Alternatively, the guide means may be secured to a stationary casing. They are then in contact with the sun gear and with the drum in order to guide those parts in rotation. Under such circumstances, the sun gear and the drum are movable relative to the guide means.

Both of these embodiments enable a compact subassembly to be prepared that facilitates assembling the reduction gear. The subassembly may comprise the drum fitted with its planet gears, the sun gear inserted inside it, the guide means, a coupling part for coupling to a motor shaft, and depending on the embodiment, optionally a casing.

In order to reduce the overall size of the subassembly, various arrangements may be envisaged:

the first guide means includes both a bore serving to guide the sun gear in rotation, and at least a radially-outer portion serving to guide the drum in rotation;

a portion of the guide means for the sun gear is located inside the drum;

the first guide means includes both a portion axially overlapping the drum and a portion projecting axially from the drum; and the maximum outside diameter of the first guide means is less than the maximum outside diameter of the drum.

This invention is particularly adapted to a simple compound planetary gearset, known as "type II".

The invention also provides an electric tubular actuator for driving a home screen, the actuator incorporating a reduction gear as mentioned above.

DESCRIPTION OF THE DRAWINGS

The invention can be better understood on reading the following description given purely by way of example and made with reference to the accompanying drawings, in which:

FIG. 3 is a view on a larger scale showing a detail B of FIG. 2; and

FIG. 4 is a perspective view of a drum fitted-out in accordance with the invention.

DESCRIPTION OF THE EMBODIMENTS

Figure 1:
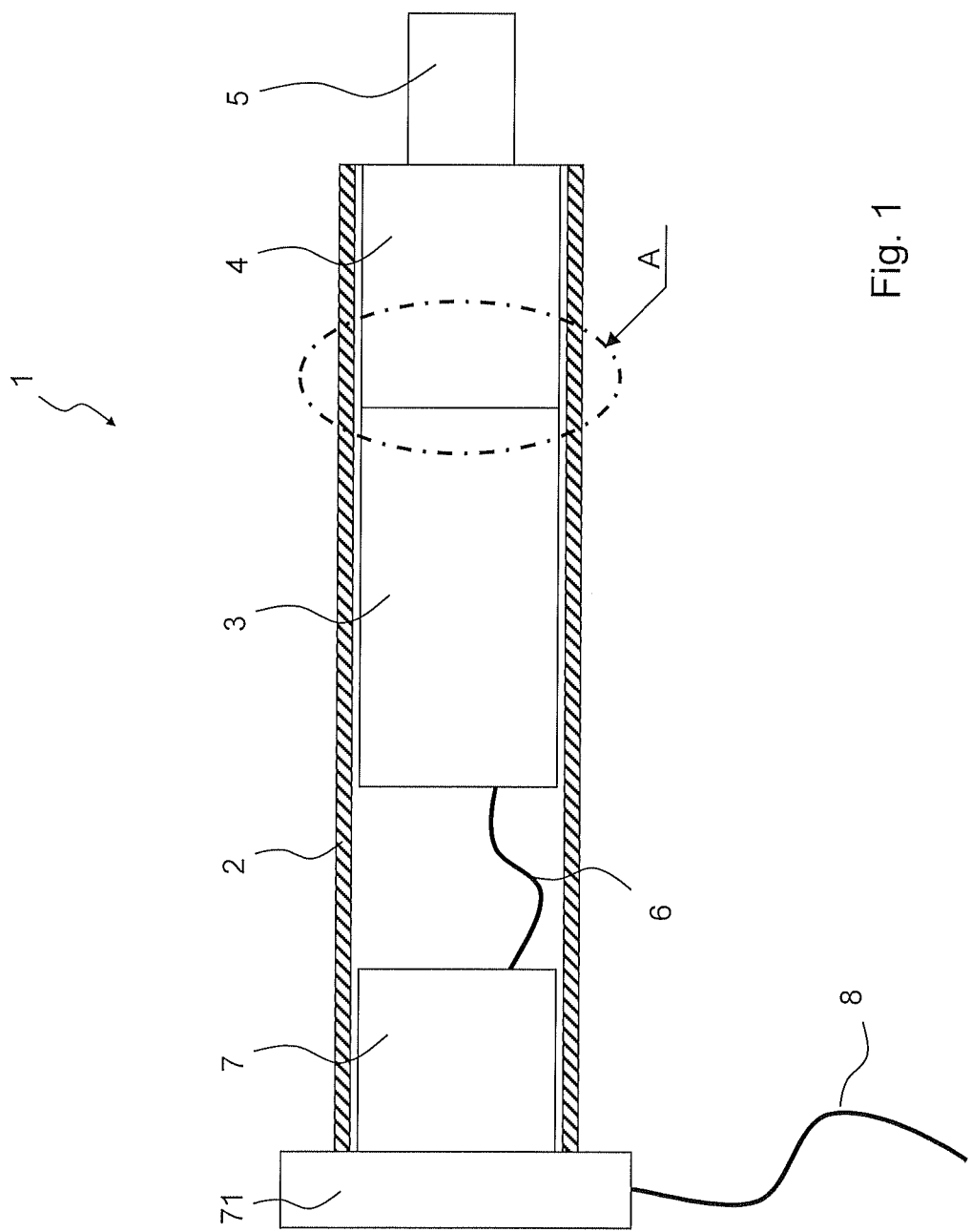
FIG. 1 is a diagrammatic illustration of the configuration of a tubular actuator.

FIG. 1 is a diagram of a tubular actuator 1 made up of a tube 2 that houses an electric motor 3 therein. The actuator is for driving a domestic screen, such as an (outdoor or indoor) sunshade, a roller blind, a video projection screen, or a shutter grid. The electric motor 3 is coupled to a reduction gear 4 so that the outlet shaft 5 of the gear rotates at a desired speed. The reduction gear 4 comprises a simple compound planetary gearset, specifically of the configuration known as type II. The outlet shaft 5 of the reduction gear corresponds to the outlet shaft of the actuator. It drives a wheel secured to a roller tube in which the actuator is inserted and around which the motor-driven screen is rolled up, these elements not being shown. The motor 3 is also powered by an electric cable 6 connected to a control module 7. Regardless of whether it is mechanical or electronic, the control module 7 serves to switch off the power supply to the motor when the screen reaches a particular position and/or when it receives an order from a control point. The control module 7 has an interface 71 for enabling the actuator 1 to be fastened to a support that is itself fastened to a structure. The control module is powered by a mains cable 8.

Figure 2:
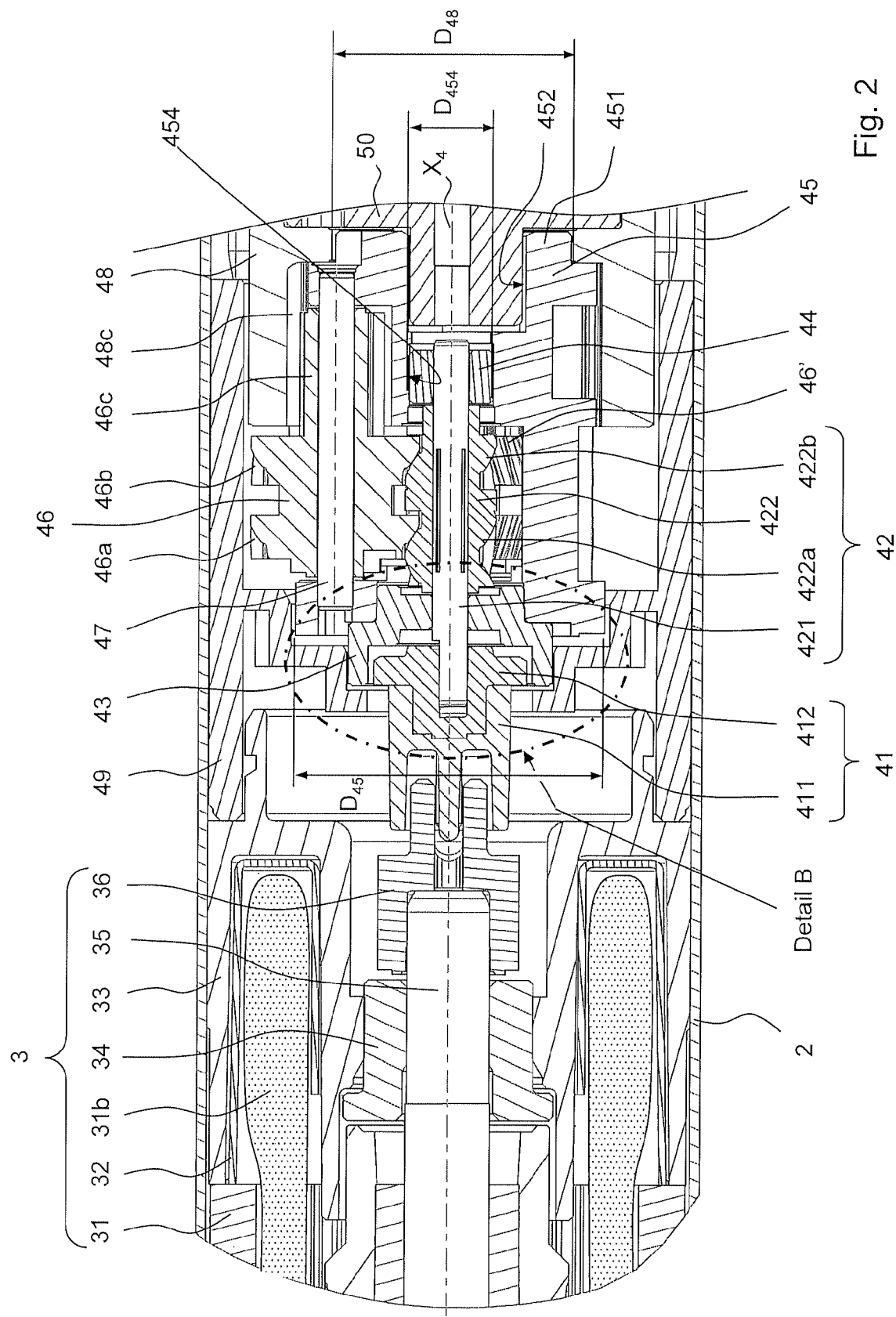
FIG. 2 is a fragmentary section of a tubular actuator showing a reduction stage of the invention, which stage corresponds to portion A in FIG. 1.

FIGS. 2 to 4 show the first stage of the reduction gear 4 of the tubular actuator 1. The motor 3 inserted inside the tube 2 comprises a wound stator 31 with the overhang 31b of the winding received inside a toroidal casing 32. The toroidal casing 32 is inserted in a bowl 33 incorporating a self-lubricating bearing 34 that guides the motor shaft 35 in rotation. The motor shaft 35 is secured to the rotor of the motor. It is driven in rotation by the wound stator 31. A first interface part 36 is fastened to one end of the motor shaft 35. It co-operates with a second interface part 41 that is fastened to the sun gear 42 of the first stage of the reduction gear 4. These two interface parts 36 and 41 form a coupling between the motor 3 and the reduction gear 4.

Advantageously, the second interface part 41 is made of two materials. A first portion 411 is made of a damping material, e.g. an elastomer. This portion co-operates with the first interface part and serves to reduce noise. The second portion 412 is made of a material that is more rigid than the first portion, e.g. a metal. This portion co-operates with the sun gear 42 and serves to transmit torque to the reduction gear.

The sun gear 42 comprises a shaft 421 and a gearwheel 422 mounted tightly on the shaft 421. The gearwheel 422 has two sets of helical teeth 422a and 422b. The sun gear 42 is driven in rotation by the second interface part 41 mounted as a tight fit on a first end of the shaft 421. It is guided in rotation by two self-lubricating bushings 43 and 44. These bushings are mounted as tight fits in a drum 45, in respective bores 453 and 454 of diameters that are written $D_{453}$ and $D_{454}$. The first bushing 43 serves to guide the shaft 421 relative to the drum 45 and it is positioned between the interface part 41 and the gearwheel 422. The first bushing 43 is secured to the drum 45. The second bushing 44 serves likewise to guide the second end of the shaft 421 relative to the drum 45.

The first bushing 43 has a radially-inner portion 431 directly surrounding the shaft 421 and that is situated radially inside the drum 45 and, along the axis $X_4$ of said drum, at the level of this drum. The outside diameter of the shaft 421 is written $D_{421}$. The shaft 421 is mounted free to rotate in a bore of the portion 431 of the first bushing 43, which portion 431 is of diameter that is written $D_{431}$. The portion 431 axially overlaps the drum 45. The bushing 43 also has a radially-outer portion 432 that extends axially out from the drum 45, towards the motor 3, thereby enabling it to co-operate with the bore 491.

The sun gear 42 meshes with three planet gears 46, 46', and 46". Each planet gear is located at 120° relative to the other two. Each planet gear rotates about a shaft 47, 47', or 47", with both ends of these shafts being mounted on the drum 45. Each planet gear has three sets of teeth 46a, 46b, and 46c. The first two sets of teeth 46a and 46b are helical and mesh with the helical sets of teeth 422a and 422b of the sun gear. The third set of teeth 46c is straight and meshes with an inside set of teeth 48c of a ring 48 stationary in a casing 49. In this way, rotation of the sun gear 422 drives the drum 45 in rotation about a common axis $X_4$. The drum is guided in rotation at one end, relative to the stationary ring 48, by a collar 451 received in a bore of the stationary ring 48 of diameter that is written $D_{48}$, and at its other end, relative to the casing 49, by the radially-outer portion 432 of the first bearing 43 that co-operates with a bore 491 in the casing 49. The outside diameter of the portion 432 is written $D_{432}$ and the inside diameter of the bore 491 in the casing 49 is written $D_{491}$, these two diameters being substantially equal.

The maximum outside diameter of the bushing 43 is the diameter $D_{432}$ of the portion 432. It is less than the maximum outside diameter $D_{45}$ of the drum 45.

The drum 45 also has an interface housing 452 for receiving a complementary shape of a part 50 of a brake, or for receiving the sun gear of a following reduction stage.

When designed in this way, assembly of the actuator as a whole can be simplified because a compact subassembly can be prepared beforehand. The compact subassembly comprises the drum, fitted with the planet gears and the two bushings, the sun gear received inside the drum and centered relative thereto by the two bushings, and the second interface part that is mounted as a tight-fit on the end of the sun gear. This compact one-piece assembly is easy to handle.

The advantage of this solution is good guidance of the sun gear relative to the drum, thereby ensuring that the sun gear is well positioned relative to the planet gear. As a result, meshing between the gearwheels is regular, so there is little backlash, and the sound level of the actuator is low.

An alternative solution consists in securing the first bushing 43 to the casing 49 instead of securing it to the drum 45. Under such circumstances, this bushing is stationary, unlike the above-described embodiment, in which it turns together with the drum. Rotary guidance is no longer provided between the first bushing 43 and the casing 49, but rather between the first bushing 43 and the drum 45, between the outside surface of a portion 433 of the first bearing, of a diameter that is written $D_{433}$, and the bore 453 of the drum 45. With this embodiment, the proposed compact subassembly is different. It additionally incorporates the casing 49.

The first bushing 43 performs two functions: it serves both to center the sun gear 42 in the drum 45 and to center the drum 45 in the casing 49. It is independent of the casing 49, thus making it possible to design it with small dimensions and thus envisage fabricating it out of a material that encourages guidance in rotation, such as self-lubricating bronze.

The invention also applies to drums constituting other types of reduction stage.

The drum is not limited to using three planet gears. It could have fewer or more of them.

The invention claimed is:

1. A reduction gear of an electric actuator for driving a home screen, the reduction gear comprising a reduction stage having a sun gear meshing with at least one planet gear rotating about a respective shaft and positioned in a drum, the planet gear meshing with a stationary ring to drive the drum in rotation about an axis of rotation, the reduction gear being characterized in that it further comprises first guide means serving both to guide the sun gear in rotation and to guide the drum in rotation about the axis of rotation.

2. A reduction gear according to claim 1, wherein second guide means serve likewise to guide the sun gear in rotation, the second guide means being received in the drum.

3. A reduction gear according to claim 1, wherein the first guide means are secured to the drum.

4. A reduction gear according to claim 1, wherein the first guide means includes both a bore, serving to guide the sun gear in rotation, and at least a radially-outer portion serving to guide the drum in rotation.

5. A reduction gear according to claim 1, wherein a portion of the guide means for the sun gear is located inside the drum.

6. A reduction gear according to claim 1, wherein the first guide means includes both a portion axially overlapping the drum and a portion projecting axially from the drum.

7. A reduction gear according to claim 1, wherein the maximum outside diameter of the first guide means is less than the maximum outside diameter of the drum.

8. A reduction gear according to claim 1, wherein the first guide means is a bushing.

9. A reduction gear according to claim 1, wherein the reduction stage is a simple compound planetary gearset (type II).

10. An electric tubular actuator for driving a home screen, wherein the actuator incorporates a reduction gear according to claim 1.

* * * * *